United States Patent
Han et al.

(10) Patent No.: US 12,021,780 B2
(45) Date of Patent: Jun. 25, 2024

(54) METHOD AND APPARATUS FOR RADIO LINK MONITORING ON SIDELINK

(71) Applicant: LENOVO (BEIJING) LIMITED, Beijing (CN)

(72) Inventors: Jing Han, Beijing (CN); Xiaodong Yu, Beijing (CN); Zhennian Sun, Beijing (CN); Xin Guo, Beijing (CN); Lianhai Wu, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 343 days.

(21) Appl. No.: 17/436,980

(22) PCT Filed: Mar. 29, 2019

(86) PCT No.: PCT/CN2019/080371
§ 371 (c)(1),
(2) Date: Sep. 7, 2021

(87) PCT Pub. No.: WO2020/198916
PCT Pub. Date: Oct. 8, 2020

(65) Prior Publication Data
US 2022/0173863 A1 Jun. 2, 2022

(51) Int. Cl.
*H04L 5/00* (2006.01)
*H04W 4/46* (2018.01)
*H04W 76/14* (2018.01)

(52) U.S. Cl.
CPC ............ *H04L 5/0051* (2013.01); *H04W 4/46* (2018.02); *H04W 76/14* (2018.02)

(58) Field of Classification Search
CPC ... H04L 5/0051; H04L 5/0053; H04L 5/0048; H04L 5/0094; H04W 4/46; H04W 76/14; H04W 72/02
See application file for complete search history.

(56) References Cited

U.S. PATENT DOCUMENTS

| | | | |
|---|---|---|---|
| 11,804,883 B2 * | 10/2023 | Li | H04L 5/0091 |
| 2018/0049224 A1 | 2/2018 | Dinan et al. | |
| 2021/0306824 A1 * | 9/2021 | Li | H04W 4/40 |
| 2022/0150730 A1 * | 5/2022 | Freda | H04L 1/188 |

FOREIGN PATENT DOCUMENTS

| | | |
|---|---|---|
| CN | 109479189 A | 3/2019 |
| WO | 2018113946 A1 | 6/2018 |

(Continued)

OTHER PUBLICATIONS

ZTE, Sanechips, Consideration on AS level sidelink management, 3GPP TSG RAN WG2 Meeting #105, R2-1900379, Feb. 25-Mar. 1, 2019, pp. 1-5, Athens, Greece.

(Continued)

*Primary Examiner* — Afshawn M Towfighi
(74) *Attorney, Agent, or Firm* — Kunzler Bean & Adamson (57) ABSTRACT

A method and an apparatus for radio link monitoring on sidelink are disclosed. The method comprises: setting up unicast transmission on a radio sidelink; and monitoring the radio sidelink based on transmission of at least one of a reference signal and data.

18 Claims, 6 Drawing Sheets

(56) References Cited

FOREIGN PATENT DOCUMENTS

WO  2020164071 A1  8/2020
WO  WO-2020167773 A1 *  8/2020  ........... H04L 1/1812

OTHER PUBLICATIONS

Huawei, Hisilicon, Sidelink measurements, 3GPP TSG RAN WG1 Meeting #96, R1-1903076, Feb. 25-Mar. 1, 2019, pp. 1-4, Athens, Greece.
Interdigital Inc., Further Details on Link Establishment Procedure, 3GPP RAN WG2 Meeting #105, R2-1901580, Feb. 25-Mar. 1, 2019, pp. 1-4, Athens, Greece.
International Searching Authority, "Written Opinion of the International Searching Authority," PCT/CN/2019080371, dated Dec. 27, 2019, pp. 1-3.
TSG SA WG2, LS on LS to SA2 on unicast, groupcast and broadcast in NR sidelink, 3GPP TSG RAN WG2#105, R2-1900064, SA WG2 Meeting #129-BIS, S2-1812895. Feb. 25-Mar. 1, 2019, pp. 1-2, Athens, Greece.

* cited by examiner

METHOD AND APPARATUS FOR RADIO LINK MONITORING ON SIDELINK

FIELD

The subject matter disclosed herein relates generally to wireless communication and more particularly relates to radio link monitoring on sidelink (SL).

BACKGROUND

The following abbreviations and acronyms are herewith defined, at least some of which are referred to in the following description.

Third Generation Partnership Project ("3GPP"), Positive-Acknowledgment ("ACK"), Channel State Information ("CSI"), Control Channel ("CCH"), Device-to-Device ("D2D"), further enhancement Device-to-Device ("feD2D"), Downlink Control Information ("DCI"), Downlink ("DL"), Demodulation Reference Signal ("DMRS"), Evolved Node B ("eNB"), European Telecommunications Standards Institute ("ETSI"), Frequency Division Duplex ("FDD"), Frequency-Division Multiplexing ("FDM"), Frequency Division Multiple Access ("FDMA"), Long Term Evolution ("LTE"), LTE Advanced ("LTE-A"), Multiple Access ("MA"), Machine Type Communication ("MTC"), Narrowband ("NB"), Negative-Acknowledgment ("NACK") or ("NAK"), Orthogonal Frequency Division Multiplexing ("OFDM"), Physical Downlink Control Channel ("PDCCH"), Physical Downlink Shared Channel ("PDSCH"), Physical Sidelink Control Channel ("PSCCH"), Physical Sidelink Shared Channel ("PSSCH"), Physical Uplink Control Channel ("PUCCH"), Physical Uplink Shared Channel ("PUSCH"), Quality of Service ("QoS"), Radio Network Temporary ("RNTI"), Identity Radio Resource Control ("RRC"), Reference Signal Receiving Power ("RSRP"), Reference Signal Strength Indicator ("RSSI"), Receive ("RX"), Scheduling Assignment ("SA"), Scheduling Request ("SR"), Shared Channel ("SCH"), Sidelink Control Information ("SCI"), System Information Block ("SIB"), Sidelink ("SL"), Semi-Persistent Scheduling ("SPS"), Sounding Reference Signal ("SRS"), Transport Block ("TB"), Transport Block Size ("TBS"), Transmission Control Protocol ("TCP"), Time Division Duplex ("TDD"), Time-Division Multiplexing ("TDM"), Transmission Time Interval ("TTI"), Transmit ("TX"), Uplink Control Information ("UCI"), User Datagram Protocol ("UDP"), User Entity/Equipment (Mobile Terminal) ("UE"), Uplink ("UL"), Universal Mobile Telecommunications System ("UMTS"), Next Generation ("NR"), Radio Access Network ("RAN"), Vehicle-to-Vehicle ("V2V") and Vehicle-to-Everything ("V2X"). As used herein, SL communication is also known as D2D communication.

In NR V2X, unicast transmission is expected to be introduced. One potential solution is to setup AS connection to realize unicast transmission on SL. The unicast link maintenance, which is related to radio link monitoring (RLM) procedure, it to be studied. This disclosure aims to proposes a solution on radio link monitoring on sidelink (SL).

BRIEF SUMMARY

An method and an apparatus for radio link monitoring on sidelink are disclosed.

According to a first aspect, there is provided a method at a remote unit, the method comprising: setting up unicast transmission on a radio sidelink; and monitoring the radio sidelink based on transmission of at least one of a reference signal and data.

In some embodiments, the reference signal is a at least one periodical sidelink reference signal, and the radio sidelink is monitored based on the transmission of the at least one periodical sidelink reference signal.

In some embodiments, the setting up unicast transmission comprising exchanging a configuration of the periodical sidelink reference signal via PC5-RRC signaling.

In some embodiments, the setting up unicast transmission comprises: transmitting a direct communication request message, receiving a direct communication accept message, transmitting an AS level configuration, and receiving an AS level configuration complete message, wherein the monitoring the radio sidelink comprises starting to transmit the periodical sidelink reference signal after receiving the direct communication accept message, or after transmitting the AS level configuration, or after receiving the AS level configuration complete message.

In some embodiments, the monitoring the radio sidelink comprises stopping transmission of the periodical sidelink reference signal in the condition that the unicast transmission is released or a radio link failure happens on the radio sidelink.

In some embodiments, the reference signal is contained in a Semi-Persistent Scheduling resource, and the radio sidelink is monitored based on the transmission of the reference signal contained in the Semi-Persistent Scheduling resource.

In some embodiments, the setting up unicast transmission comprising exchanging a configuration of the Semi-Persistent Scheduling (SPS) resource via PC5-RRC signaling.

In some embodiments, the setting up unicast transmission comprises: transmitting a direct communication request message, receiving a direct communication accept message, transmitting an AS level configuration, and receiving an AS level configuration complete message, wherein the monitoring the radio sidelink comprises starting to transmit or activate the Semi-Persistent Scheduling resource after receiving the direct communication accept message, or after transmitting the AS level configuration, or after receiving the AS level configuration complete message.

In some embodiments, the monitoring the radio sidelink comprises starting transmission of the Semi-Persistent Scheduling resource in the condition that there is no existing SPS configuration for data transmission or the existing SPS configuration for data transmission does not meet monitoring requirement.

In some embodiments, the monitoring the radio sidelink comprises stopping transmission of the Semi-Persistent Scheduling resource in the condition that the unicast transmission is released or a radio link failure happens on the radio sidelink.

In some embodiments, the monitoring the radio sidelink comprises stopping or deactivating transmission of the Semi-Persistent Scheduling resource in the condition that a new SPS configuration for data transmission is configured and the new SPS configuration for data transmission or a combination of the new SPS configuration for data transmission and existing SPS configuration for data transmission meetsi monitoring requirement.

In some embodiments, the radio sidelink is monitored based on the transmission of data.

In some embodiments, the monitoring the radio sidelink comprises sending a request message to request transmission of the reference signal or data for monitoring.

In some embodiments, the monitoring the radio sidelink comprises, in the condition that there is no data transmission or there is not enough data transmission for monitoring for a time period, transmitting the reference signal or data for monitoring.

In some embodiments, the radio sidelink is monitored based on a combination of the transmission of a periodical reference signal and the transmission of data.

In some embodiments, the monitoring the radio sidelink comprises, in the condition that there is no data transmission or there is not enough data transmission for monitoring for a time period, transmitting the periodical reference signal.

In some embodiments, the monitoring the radio sidelink comprises, in the condition that there is enough data transmission for monitoring, stopping transmission of the periodical reference signal.

According to a second aspect, there is provided a remote unit, comprising: a transceiver, and a processor that, sets up unicast transmission on a radio sidelink; and monitors the radio sidelink based on transmission of at least one of a reference signal and data.

BRIEF DESCRIPTION OF THE DRAWINGS

A more particular description of the embodiments briefly described above will be rendered by reference to specific embodiments that are illustrated in the appended drawings. Given that these drawings depict only some embodiments and are not therefore to be considered to limit scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or a program product. Accordingly, embodiments may take the form of an all-hardware embodiment, an all-software embodiment (including firmware, resident software, micro-code, etc.), or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer-readable storage devices storing machine readable code, computer-readable code, and/or program code, collectively referred to hereafter as "code". The storage devices may be tangible, non-transitory, and/or non-transmission. The storage devices may not embody signals. In a certain embodiment, the storage devices only employ signals for accessing code.

Any combination of one or more computer-readable medium may be utilized. The computer-readable medium may be a computer-readable storage medium. The computer-readable storage medium may be a storage device storing the code. The storage device may be, for example, but is not limited to being, an electronic, magnetic, optical, electromagnetic, infrared, holographic, micromechanical, or semiconductor system, apparatus, or device, or any suitable combination of the foregoing.

A non-exhaustive list of more specific examples of the storage device may include the following: an electrical connection having one or more wires, a portable computer diskette, a hard disk, random-access memory ("RAM"), read-only memory ("ROM"), an erasable programmable read-only memory ("EPROM" or flash memory), a portable compact disc read-only memory ("CD-ROM"), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Reference throughout this specification to "one embodiment", "an embodiment", or similar language, means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but not limited to", unless expressly specified otherwise. An enumerated listing of items does not imply that any or all of the items are mutually exclusive, unless expressly specified otherwise. The terms "a", "an", and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions—executed via the processor of the computer or other programmable data-processing apparatus—create a means for implementing the functions/acts specified in the schematic flowchart diagrams and/or schematic block diagrams.

The code may also be stored in a storage device that can direct a computer, other programmable data-processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data-processing apparatus, or other devices to cause a series of operational steps to be performed on the computer, other programmable apparatus, or other devices to produce a computer implemented process such that the code executed on the computer or other programmable apparatus provides processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be substantially executed in concurrence, or the blocks may sometimes be executed in reverse order, depending upon the functionality involved. Other steps and methods may be conceived that are equivalent in function, logic, or effect to one or more blocks, or portions thereof, from the illustrated Figures.

The description of elements in each figure may refer to elements of proceeding figures. Like numbers refer to like elements in all figures, including alternate embodiments of like elements.

Exemplary schemes for radio link monitoring based on periodical RS, exemplary schemes for radio link monitoring based on SPS, exemplary ways for radio link monitoring based on data transmission and the exemplary ways for radio link monitoring based on the combination of data transmission and periodical RS are to be described in details below with respect to FIG. 1 to FIG. 4.

First Embodiment

In the case that periodical RS on SL, e.g., SL-SS for synchronization purpose, CSI-RS for CQI or RI feedback purpose, etc., is introduced, at least one of these periodical RSs may be configured for SL RLM purpose. Under this circumstance, new trigger or new condition to transmit periodical RS (SL-SS or CSI-RS) for SL RLM purpose is proposed in a first embodiment.

Figure 1:
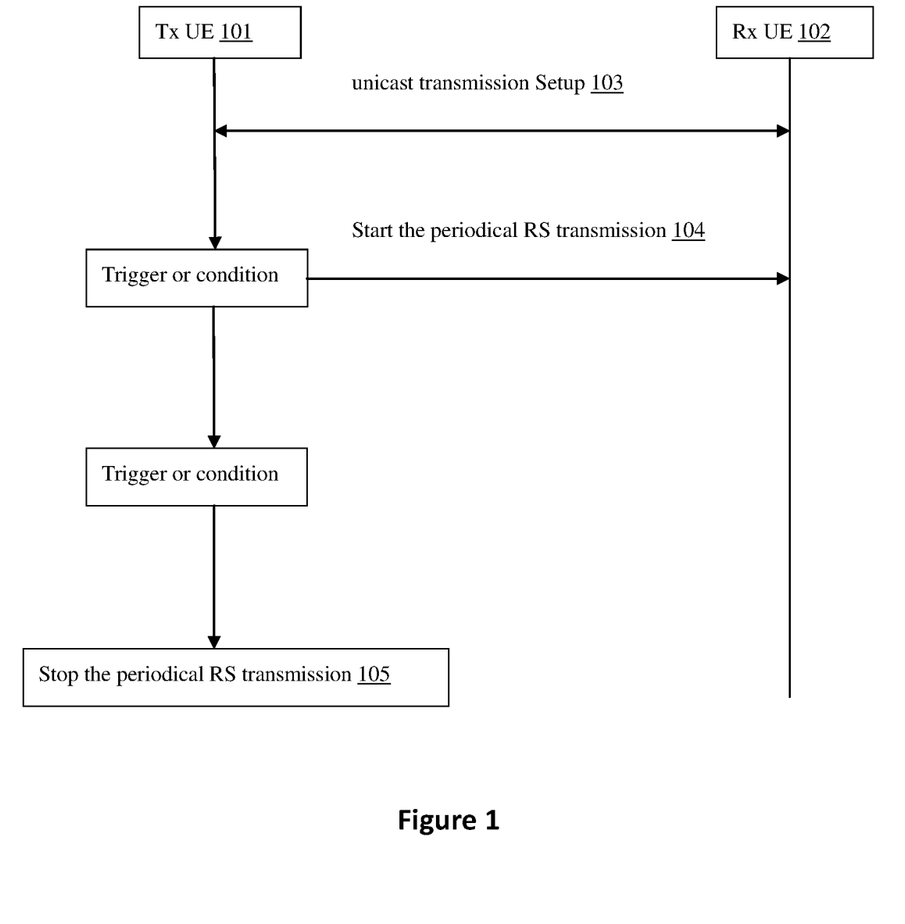
FIG. 1 is a flow chart illustrating data transmission between a Tx UE and a Rx UE in the case that SL RLM is based on periodical RS according to a first embodiment.

FIG. 1 is a flow chart illustrating data transmission between a Tx UE 101 and a Rx UE 102 in the case that SL RLM is based on periodical RS according to the first embodiment. As shown in FIG. 1, SL communication between the Tx UE 101 and the Rx UE 102 begins at step 103, in which unicast transmission is set up between the Tx UE 101 and the Rx UE 102. Particularly, in the setup procedure, a direct link communication is set up by PC5-S procedure in NAS layer. In addition, AS level configuration is exchanged between the Tx UE 101 and the Rx UE 102 in AS layer via PC5-RRC signaling on SL. More specifically, the setup procedure includes: steps of: (1) the Tx UE 101 transmits a direct communication request message such as DIRECT_COMMUNICATION_REQUEST message to the Rx UE 102; (2) the Tx UE 101 receives a direct communication accept message such as DIRECT_COMMUNICATION_ACCEPT message from the Rx UE 102; (3) the Tx UE 101 transmits AS level configuration to the Rx UE 102; (4) the Tx UE 101 receives an AS level configuration complete message from the Rx UE 102. In the AS level configuration, the Tx UE 101 indicates the SL-RLM RS configuration to the Rx UE 102. The SL-RLM RS configuration is obtained from a gNB (not shown in FIG. 1) or may be pre-configured in the Tx UE 101. The SL-RLM RS configuration may include the information of the transmission resource location, transmission periodicity, RS information, etc. For example, the SL-RLM RS may be one of SL-SS, CSI-RS and Sounding RS or a combination thereof.

At step 104, the Tx UE 101 starts the transmission of SL-RLM RS based on certain trigger or condition. The Tx UE 101 may start the SL-RLM RS transmission after certain step of the unicast transmission setup procedure. For example, the Tx UE 101 may start the SL-RLM RS transmission after above step (2) of the unicast transmission setup procedure, that is, the Tx UE 101 may start the SL-RLM RS transmission after receiving the direct communication accept message. Alternatively, the Tx UE 101 may start the SL-RLM RS transmission after above step (3) of the unicast transmission setup procedure, that is, after AS level configuration transmission on SL. For another example, the Tx UE 101 may start the SL-RLM RS transmission after above step (4) of the unicast setup transmission procedure, that is, after receiving the AS level configuration complete message on SL.

At step 105, the Tx UE 101 stops the transmission of SL-RLM RS based on certain trigger or condition. For example, the Tx UE 101 may stop the SL-RLM RS transmission when radio link failure happens on SL. For another example, the Tx UE 101 may stop the SL-RLM RS transmission when the unicast transmission is released. Particularly, after the Tx UE 101 receives a direct communication release accept message such as DIRECT_COMMUNICATION_RELEASE_ACCEPT message from the Rx UE 102 or a higher layer indicates the Tx UE 101 that the unicast transmission is stopped or released, the Tx UE 101 may stop the SL-RLM RS transmission.

In sum, after the unicast transmission setup is complete, the periodical RS should be transmitted from the Tx UE 101 to the Rx UE 102, so that the radio SL can be monitored.

Second Embodiment

In the case that there is no periodical RS that can be used for RLM purpose, a RLM purpose Semi-Persistent Scheduling (SPS) resource for SL (referred to as SL-RLM SPS hereinafter) may be configured to contain a periodical RS. For example, after the completion of unicast transmission setup, gNB or Tx UE may configure a SL-RLM SPS resource.

Figure 2:
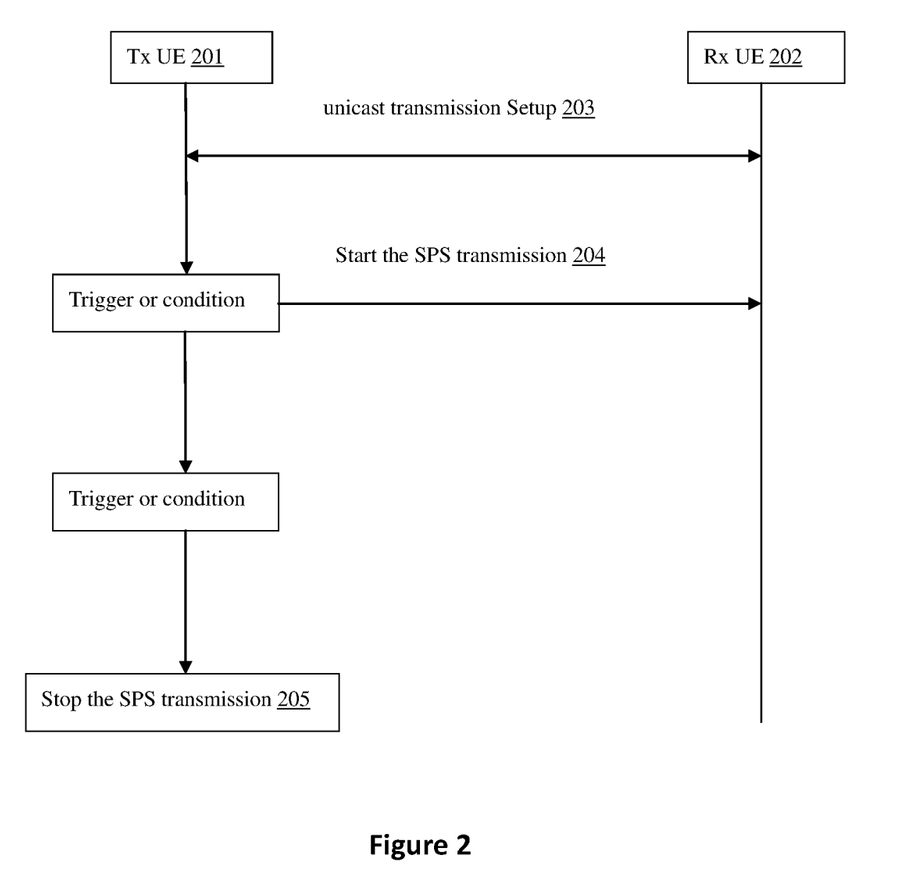
FIG. 2 is a flow chart illustrating data transmission between a Tx UE and a Rx UE in the case that SL RLM is based on SPS according to a second embodiment.

FIG. 2 is a flow chart illustrating data transmission between a Tx UE 201 and a Rx UE 202 in the case that SL RLM is based on SPS resource according to a second embodiment. As shown in FIG. 2, SL communication between Tx UE 201 and Rx UE 202 begins at step 203, in which unicast transmission is set up between the Tx UE 201 and the Rx UE 202. Similar to the first embodiment, in the setup procedure, a direct link communication is set up by PC5-S procedure in NAS layer. In addition, AS level configuration is exchanged between the Tx UE 201 and the Rx UE 202 in AS layer via PC5-RRC signaling on SL. More specifically, the setup procedure includes steps of: (1) the Tx UE 201 transmits a direct communication request message to the Rx UE 202; (2) the Tx UE 201 receives a direct communication accept message such as DIRECT_COMMUNICATION_ACCEPT message from the Rx UE 202; (3) the Tx UE 201 transmits AS level configuration to the Rx UE 202; (4) the Tx UE 201 receives an AS level configuration complete message from the Rx UE 202. In the AS level configuration, the Tx UE 201 indicates the SL-RLM SPS configuration to the Rx UE 202. The SL-RLM SPS configuration is obtained from gNB (not shown in FIG. 2) or it may be configured by the Tx UE 201. The SL-RLM SPS configuration may include the information of the SPS resource location, transmission format, resource periodicity, etc.

At step 204, the Tx UE 201 starts the transmission of SL-RLM SPS resource based on certain trigger or condition. The Tx UE 201 may start the SL-RLM SPS transmission after certain step of the unicast transmission setup procedure. For example, the Tx UE 201 may start the SL-RLM SPS transmission after above step (2) of the unicast transmission setup procedure, that is, the Tx UE 201 may start the SL-RLM SPS transmission after receiving the DIRECT_COMMUNICATION_ACCEPT message. Alternatively, the Tx UE 201 may start the SL-RLM SPS transmission after above step (3) of the unicast transmission setup procedure, that is, after AS level configuration transmission on SL. For another example, the Tx UE 201 may start the SL-RLM SPS transmission after above step (4) of the unicast transmission setup procedure, that is, after receiving the AS level configuration complete message on SL.

Alternatively, the Tx UE 201 may start or activate the SL-RLM SPS transmission taking into consideration existing SPS configuration for data transmission. Specifically, SL-RLM SPS configuration may be activated when there is no existing SPS configuration for data transmission, or the existing SPS configuration for data transmission does not meet the SL-RLM requirement. For instance, the SL-RLM may require that the data should be transmitted at least every 10 ms. If the existing SPS configuration for data transmission does not meet this SL-RLM requirement, then a SL-RLM SPS configuration that meets this SL-RLM requirement may be started and/or activated by the Tx UE 201. For another example, the SL-RLM SPS configuration may be activated when the existing SPS configuration for data transmission (that meets the SL-RLM requirement) is de-configured for a time period. For example, if the existing SPS configuration for data transmission is de-configured, the Tx UE 201 starts a timer, e.g., for 20 ms. When the timer expires, if there are no new SPS configuration for data transmission or the new SPS configuration for data transmission does not meet the SL-RLM requirement, the Tx UE 201 may start or activate a new SPS configuration for SL-RLM purpose.

The main purpose in SPS resource for SL-RLM purpose is to transmit DMRS contained in the SPS resource, while no data or little data will be transmitted. In the second embodiment, the Tx UE 201 may start the SL-RLM SPS transmission to the Rx UE 202, and the Rx UE 202 may monitor DMRS contained in the SPS resource for SL-RLM purpose.

At step 205, the Tx UE 201 stops the transmission of SL-RLM SPS resource based on certain trigger or condition. For example, the Tx UE 201 may stop the SL-RLM SPS transmission when radio link failure happens on SL. For another example, the Tx UE 201 may stop the SL-RLM RS transmission when the unicast transmission is released. Particularly, after the Tx UE 201 receives a direct communication release accept message such as DIRECT_COMMUNICATION_RELEASE_ACCEPT message from the Rx UE 202 or a higher layer indicates the Tx UE 201 that the unicast transmission is stopped or released, the Tx UE 201 may stop the SL-RLM RS transmission.

Alternatively, the Tx UE 201 may stop the SL-RLM SPS transmission when new SPS configuration for data transmission is configured. Specifically, SL-RLM SPS resource is de-activated or de-configured when the new SPS configuration for data transmission is configured and the new SPS configuration for data transmission or a combination of the new SPS configuration for data transmission and existing SPS configuration for data transmission meets the SL-RLM requirement.

For example, in the condition that the SL-RLM SPS resource is configured and the Rx UE 202 is monitoring the SL-RLM SPS resource for SL-RLM, a new SPS configuration for data transmission is configured. If the new SPS configuration for data transmission meets the SL-RLM requirement, the Tx UE 201 may de-configure or de-activate the SL-RLM SPS resource. In addition, even if the new SPS configuration for data transmission does not meet the SL-RLM requirement, so long as a combination of the new SPS configuration for data transmission and existing SPS configuration for data transmission meets the SL-RLM requirement, the Tx UE 201 may de-configure or de-activate the SL-RLM SPS resource. The Rx UE 202 may stop monitoring the SL-RLM SPS resource.

Third Embodiment

In the case that RLM is based on non-periodical data transmission, the problem lies in that data transmission is unpredictable, and there might be no data or little data during RLM evaluation period, so that RLM cannot always be done.

Figure 3A:
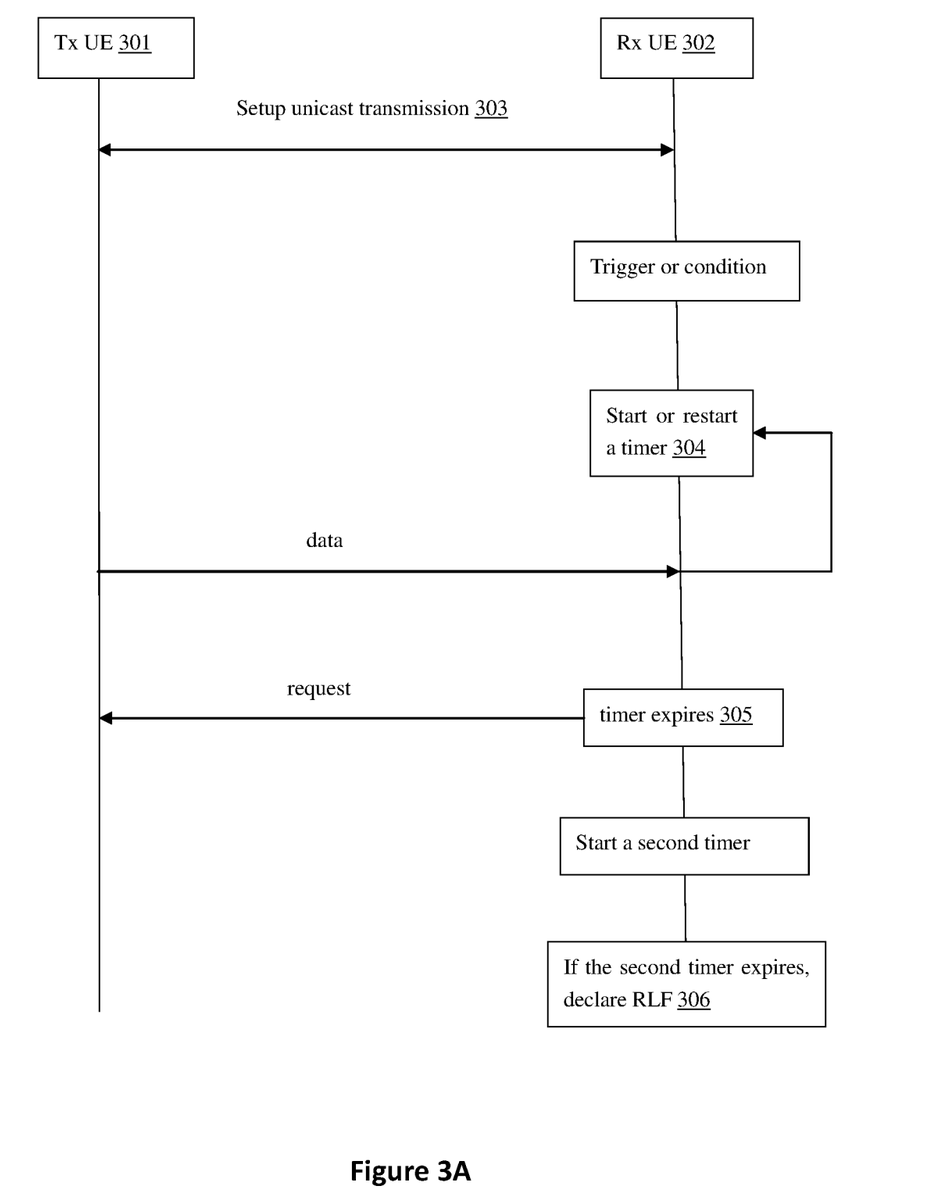
FIG. 3A is a flow chart illustrating an example of data transmission between a Tx UE and a Rx UE in the case that SL RLM is based on data transmission according to a third embodiment.

A third embodiment is proposed to solve this problem. FIG. 3A is a flow chart illustrating an example of data transmission between a Tx UE 301 and a Rx UE 302 in the case that SL RLM is based on data transmission according to the third embodiment.

As shown in FIG. 3A, SL communication between the Tx UE 301 and the Rx UE 302 begins at step 303, in which unicast transmission is setup between the Tx UE 301 and the Rx UE 302. Similar to the first embodiment, in the setup procedure, the direct link communication is set up by PC5-S procedure in NAS layer. In addition, AS level configuration is exchanged between the Tx UE 301 and the Rx UE 302 in AS layer via PC5-RRC signaling on SL. More specifically, the setup procedure includes steps of: (1) the Tx UE 301 transmits a direct communication request message to the Rx UE 302; (2) the Tx UE 301 receives a direct communication accept message such as DIRECT_COMMUNICATION_ACCEPT message transmitted from the Rx UE 302; (3) the Tx UE 301 transmits AS level configuration to the Rx UE 302; (4) the Tx UE 301 receives an AS level configuration complete message from the Rx UE 302.

At step 304, the Rx UE 302 starts a timer based on certain trigger or condition. The Rx UE 302 may start the timer after certain step of the unicast transmission setup procedure. For example, the Rx UE 302 may start the timer after above step (2) of the unicast transmission setup procedure, that is, the Rx UE 302 may start the timer after transmitting the direct communication accept message. Alternatively, the Rx UE 302 may start the timer after above step (3) of the unicast transmission setup procedure, that is, after receiving AS level configuration on SL. For another example, the Rx UE 302 may start the timer after above step (4) of the unicast setup transmission procedure, that is, after transmitting the AS level configuration complete message on SL.

The timer may be set to for example 10 ms. Before the timer expires, if there is data received from the Tx UE 301, the flow goes back to step 304, and the Rx UE 302 re-starts the timer.

If there is no data received from the Tx UE 301 until the timer expires, the Rx UE 302 sends a request message to the Tx UE 301 or gNB (not shown in FIG. 3A) for SL-RLM transmission at step 305. After the request message is send, the Rx UE 302 starts a second timer to expect to receive a response to the request message, such as data transmission from the Tx UE 301 for SL-RLM. The second timer may be set to for example 10 ms.

If there is no data received from the Tx UE 301 after the second timer expires, the Rx UE 302 declares RLF at step 306.

Figure 3B:
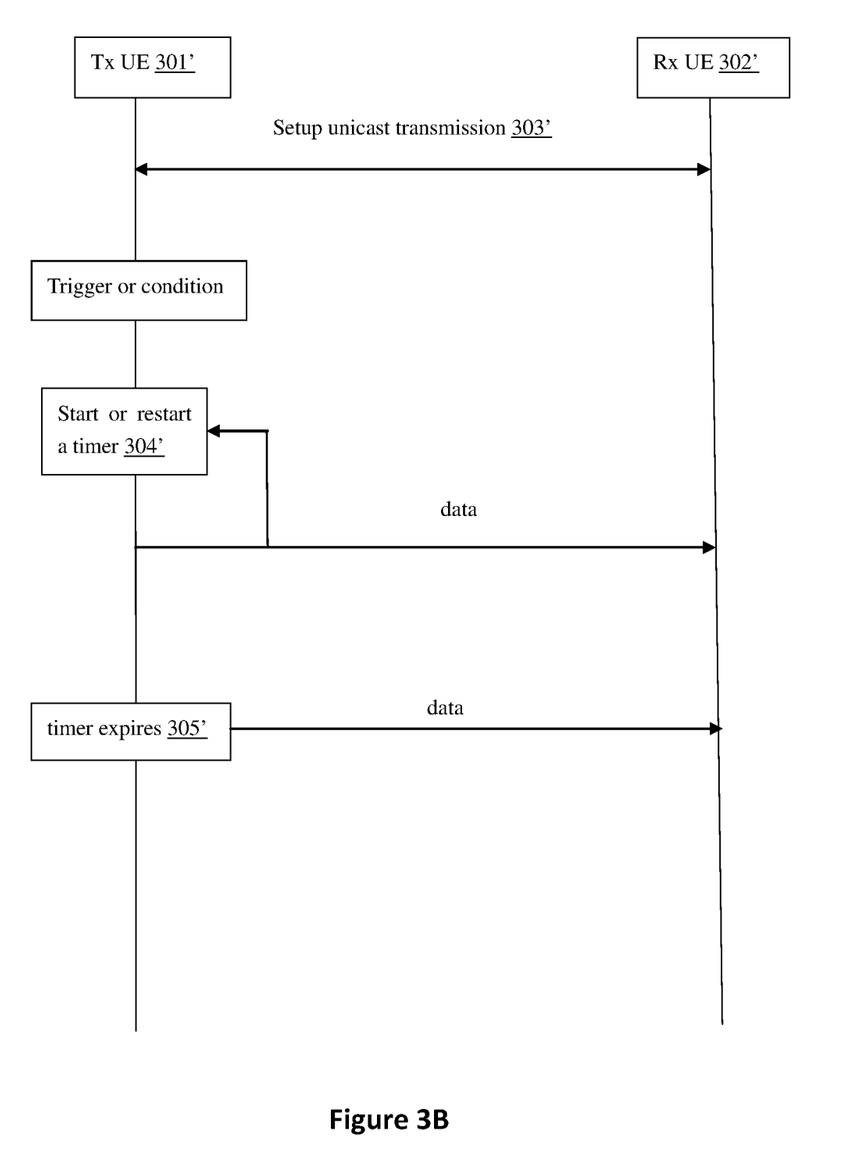
FIG. 3B is a flow chart illustrating another example of data transmission between a Tx UE and a Rx UE in the case that SL RLM is based on data transmission according to the third embodiment.

FIG. 3B is a flow chart illustrating another example of data transmission between a Tx UE 301' and a Rx UE 302' in the case that SL RLM is based on data transmission according to the third embodiment;

As shown in FIG. 3B, SL communication between the Tx UE 301' and the Rx UE 302' begins at step 303', in which unicast transmission is set up between the Tx UE 301' and the Rx UE 302'. Similar to the first embodiment, in the setup procedure, the direct link communication is set up by PC5-S procedure in NAS layer. In addition, AS level configuration is exchanged between the Tx UE 301' and the Rx UE 302' in AS layer via PC5-RRC signaling on SL. More specifically, the setup procedure includes steps of: (1) the Tx UE 301' transmits a direct communication request message to the Rx UE 302'; (2) the Tx UE 301' receives a direct communication accept message such as DIRECT_COMMUNICATION_ACCEPT message from the Rx UE 302'; (3) the Tx UE 301' transmits AS level configuration to the Rx UE 302'; (4) the Tx UE 301' receives an AS level configuration complete message from the Rx UE 302'.

At step 304', the Tx UE 301' starts a timer based on certain trigger or condition. The Tx UE 301' may start the timer after certain step of the unicast transmission setup procedure. For example, the Tx UE 301' may start the timer after above step (2) of the unicast transmission setup procedure, that is, the Tx UE 301' may start the timer after receiving the direct communication accept message. Alternatively, the Tx UE 301' may start the timer after above step (3) of the unicast transmission setup procedure, that is, after AS level configuration transmission on SL. For another example, the Tx UE 301' may start the timer after above step (4) of the unicast setup transmission procedure, that is, after receiving the AS level configuration complete message on SL.

The timer may be set to for example 10 ms. Before the timer expires, if there is data transmitted to the Rx UE 302', the flow goes back to step 304', and the Tx UE 301' re-starts the timer.

If there is no data transmitted to the Rx UE 302' until the timer expires, the Tx UE 301' transmits data to the Rx UE 302' for SL-RLM purpose autonomously at step 305'.

Fourth Embodiment

The first to third embodiments describe monitoring the radio SL based on periodical RS, based on SPS resource, and based on non-periodical data, respectively. However, the periodical RS and SPS transmissions has large overhead, whereas non-periodical data is un-predictable and there may be no data transmission or little data transmission (i.e., not enough data transmission that could be used for RLM) during a relatively long period. There is thus a need to develop a new mechanism for combining periodical RS transmission and non-periodical data transmission for SL RLM purpose.

In the case that the radio SL is monitored based on a combination of the transmission of the periodical RS and the transmission of data, periodical RS may be transmitted when there is no data transmission.

Figure 4:
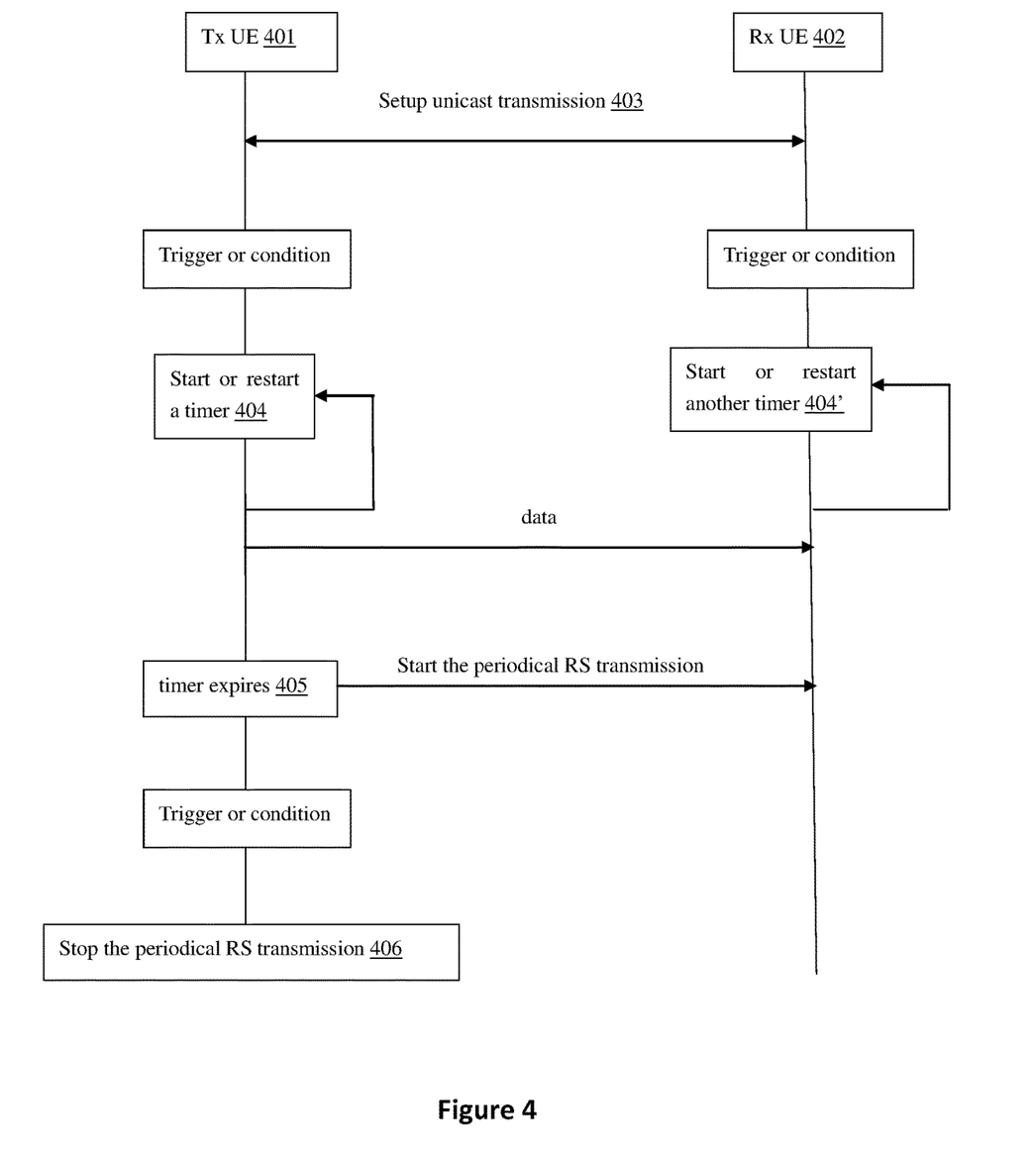
FIG. 4 is a flow chart illustrating data transmission between a Tx UE and a Rx UE in the case that SL RLM is based on the combination of transmission of data and periodical RS according to a fourth embodiment.

FIG. 4 is a flow chart illustrating data transmission between a Tx UE 401 and a Rx UE 402 in the case that SL RLM is based on a combination of data transmission and periodical RS transmission according to a fourth embodiment. As shown in FIG. 4, SL communication between the Tx UE 401 and the Rx UE 402 begins at step 403, in which unicast transmission is set up between the Tx UE 401 and the Rx UE 402. Similar to the first embodiment, in the setup procedure, the direct link communication is set up by PC5-S procedure in NAS layer. In addition, AS level configuration is exchanged between the Tx UE 401 and the Rx UE 402 in AS layer via PC5-RRC signaling on SL. More specifically, the setup procedure includes steps of: (1) the Tx UE 401 transmits a direct communication request message to the Rx UE 402; (2) the Tx UE 401 receives a direct communication accept message such as DIRECT_COMMUNICATION_ACCEPT message from the Rx UE 402; (3) the Tx UE 401 transmits AS level configuration to the Rx UE 402; (4) the Tx UE 401 receives an AS level configuration complete message from the Rx UE 402. In the AS level configuration, the Tx UE 401 indicates the SL-RLM RS configuration to the Rx UE 402.

At step 404, the Tx UE 401 starts a timer based on certain trigger or condition. The Tx UE 401 may start the timer after certain step of the unicast setup procedure. For example, the Tx UE 401 may start the timer after above step (2) of the unicast transmission setup procedure, that is, the Tx UE 401 may start the timer after receiving the direct communication accept message. Alternatively, the Tx UE 401 may start the timer after above step (3) of the unicast transmission setup procedure, that is, after AS level configuration transmission on SL. For another example, the Tx UE 401 may start the timer after above step (4) of the unicast setup transmission procedure, that is, after receiving the AS level configuration complete message on SL.

The timer may be set to for example 10 ms. Before the timer expires, if there is data transmitted to the Rx UE 402, the flow goes back to step 404, and the Tx UE 401 re-starts the timer.

The Rx UE 402 may also starts another timer at the same time as the Tx UE 401 at step 404'. The other timer may also be set to for example 10 ms. The Rx UE 402 re-starts the other timer if there is no data reception from the Tx UE 401.

If there is no data transmitted to the Rx UE 402 or there is not enough data transmitted to the Rx UE 402 until the timer expires (step 405), the Tx UE 401 starts or activates SL-RLM RS transmission. "Not enough data" means that the transmitted data is not enough for monitoring the radio sidelink. The Rx UE 402 starts monitoring the SL-RLM RS transmission after the timer is expired.

At step 406, the Tx UE 401 stops the transmission of SL-RLM RS based on certain trigger or condition. For example, the Tx UE 401 may stop the SL-RLM RS transmission when radio link failure happens on SL. For another example, the Tx UE 401 may stop the SL-RLM RS transmission when the unicast transmission is released. Particularly, after the Tx UE 401 receives a direct communication release accept message such as DIRECT_COMMUNICATION_RELEASE_ACCEPT message from the Rx UE 402 or a higher layer indicates the Tx UE 401 that the unicast transmission is stopped or released, the Tx UE 401 may stop the SL-RLM RS transmission. As another example, the Tx UE 401 stops the SL-RLM RS transmission if there are new data transmission. The Rx UE 402 also stops monitoring SL-RLM RS accordingly.

In sum, the transmission of the periodical RS may be controlled by a timer. For example, when the Tx UE transmits a unicast data to the Rx UE, the Tx UE starts a timer. If there is no data transmission (or not enough data) until the timer expires, the Tx UE triggers periodical RS transmission. As for the Rx UE, the Rx UE maintains another timer (that may be the same as the timer) and starts the other timer upon receiving data from the Tx UE. If there is no data being received until the other timer expires, the Rx UE starts periodical RS monitoring. Specifically, the configuration of periodical RS may be exchanged during unicast transmission setup, and the Rx UE only monitors such periodical RS after the other timer expires. On the other hand, the periodical RS transmission may be stopped when there is data transmission again.

Figure 5:
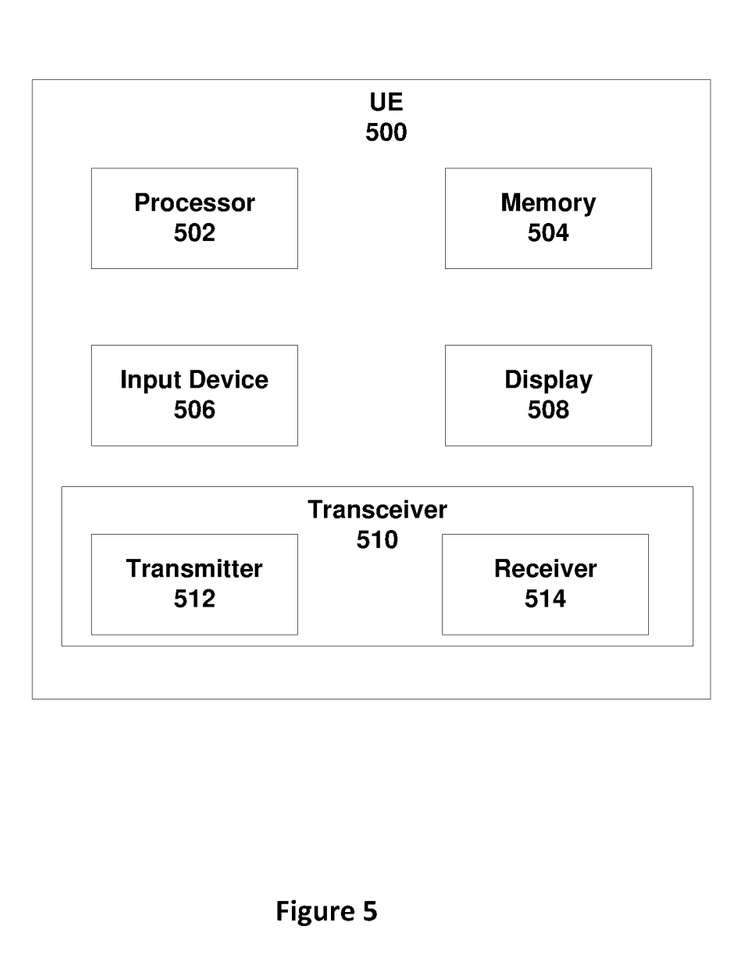
FIG. 5 is a schematic block diagram illustrating components of a UE according to one embodiment.

FIG. 5 is a schematic block diagram illustrating components of a UE according to one embodiment.

UE 500 is an embodiment of the Tx UR or Rx UE described in FIGS. 1 to 4. Furthermore, UE 500 may include a processor 502, a memory 504, and a transceiver 510. In some embodiments, UE 500 may include an input device 506 and/or a display 508. In certain embodiments, the input device 506 and the display 508 may be combined into a single device, such as a touch screen.

The processor 502, in one embodiment, may include any known controller capable of executing computer-readable instructions and/or capable of performing logical operations. For example, the processor 502 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 502 executes instructions stored in the memory 504 to perform the methods and routines described herein. The processor 502 is communicatively coupled to the memory 504, the input device 506, the display 508, and the transceiver 510.

In some embodiments, the processor 502 controls the transceiver 510 to transmit and/or receive signals.

The memory 504, in one embodiment, is a computer-readable storage medium. In some embodiments, the memory 504 includes volatile computer storage media. For example, the memory 504 may include RAM, including dynamic RAM ("DRAM"), synchronous dynamic RAM ("SDRAM"), and/or static RAM ("SRAM"). In some embodiments, the memory 504 includes non-volatile computer storage media. For example, the memory 504 may include a hard disk drive, flash memory, or any other suitable non-volatile computer storage device. In some embodiments, the memory 504 includes both volatile and non-volatile computer storage media. In some embodiments, the memory 504 stores data relating to the pre-emption indicator received from the Rx UE. In some embodiments, the memory 504 also stores program code and related data, such as an operating system or other controller algorithms operating on UE 500.

UE 500 may optionally include an input device 506. The input device 506, in one embodiment, may include any known computer input device including a touch panel, a button, a keyboard, a stylus, a microphone, or the like. In some embodiments, the input device 506 may be integrated with the display 508, for example, as a touch screen or similar touch-sensitive display. In some embodiments, the input device 506 includes a touch screen such that text may be inputted using a virtual keyboard displayed on the touch screen and/or by handwriting on the touch screen. In some embodiments, the input device 506 includes two or more different devices, such as a keyboard and a touch panel. In certain embodiments, the input device 506 may include one or more sensors for monitoring an environment of UE 500.

UE 500 may optionally include a display 508. The display 508, in one embodiment, may include any known electronically controllable display or display device. The display 508 may be designed to output visual, audible, and/or haptic signals. In some embodiments, the display 508 includes an electronic display capable of outputting visual data to a user. For example, the display 508 may include, but is not limited to being, an LCD display, an LED display, an OLED display, a projector, or a similar display device capable of outputting images, text, or the like, to a user. As another non-limiting example, the display 508 may include a wearable display such as a smart watch, smart glasses, a heads-up display, or the like. Further, the display 508 may be a component of a smart phone, a personal digital assistant, a television, a table computer, a notebook (laptop) computer, a personal computer, a vehicle dashboard, or the like.

In certain embodiments, the display 508 may include one or more speakers for producing sound. For example, the display 508 may produce an audible alert or notification (e.g., a beep or chime). In some embodiments, the display 508 includes one or more haptic devices for producing vibrations, motion, or other haptic feedback. In some embodiments, all or portions of the display 508 may be integrated with the input device 506. For example, the input device 506 and display 508 may form a touch screen or similar touch-sensitive display. In other embodiments, the display 508 may be located near the input device 506.

The transceiver 510, in one embodiment, is configured to communicate wirelessly with another UE. In certain embodiments, the transceiver 510 comprises a transmitter 512 and a receiver 514. The transmitter 512 is used to transmit data or signals and the receiver 514 is used to receive data or signals.

The transmitter 512 and the receiver 514 may be any suitable type of transmitter or receiver, respectively. Although only one transmitter 512 and one receiver 514 are illustrated, the transceiver 510 may have any suitable number of transmitters 512 and receivers 514. For example, in some embodiments, UE 500 includes a plurality of transmitter 512 and receiver 514 pairs for communicating on a plurality of wireless networks and/or radio frequency bands, each transmitter 512 and receiver 514 pair configured to communicate on a different wireless network and/or radio frequency band than the other transmitter 512 and receiver 514 pairs.

Embodiments may be practiced in other specific forms. The described embodiments are to be considered in all respects only as illustrative and not as restrictive. The scope of the invention is, therefore, indicated by the appended claims rather than by the foregoing description. All changes which fall within the meaning and range of equivalency of the claims are to be embraced within their scope.

The invention claimed is:

1. A method performed by a first user equipment (UE), the method comprising:
    setting up unicast transmission on a radio sidelink;
    sending a request message to a second UE, wherein the request message comprises a request that the second UE transmit data for monitoring;
    receiving a reference signal from the second UE; and
    monitoring the radio sidelink based on the data and the reference signal.

2. The method of claim 1, wherein the reference signal comprises at least one periodical sidelink reference signal, and the radio sidelink is monitored based on the transmission of the at least one periodical sidelink reference signal.

3. The method of claim 2, wherein the setting up the unicast transmission comprises exchanging a configuration of the at least one periodical sidelink reference signal via vehicle to vehicle radio resource control signaling.

4. The method of claim 2, wherein the setting up the unicast transmission comprises: transmitting a direct communication request message, receiving a direct communication accept message, transmitting an access stratum level configuration, and receiving an access stratum level configuration complete message, wherein the monitoring the radio sidelink comprises the second UE starting to transmit the at least one periodical sidelink reference signal after receiving the direct communication accept message, or after transmitting the access stratum level configuration, or after receiving the access stratum level configuration complete message.

5. The method of claim 2, wherein the monitoring the radio sidelink comprises the second UE stopping transmission of the at least one periodical sidelink reference signal in the condition that the unicast transmission is released or a radio link failure happens on the radio sidelink.

6. The method of claim 1, wherein the reference signal is contained in a semi-persistent scheduling resource, and the radio sidelink is monitored based on the transmission of the reference signal contained in the semi-persistent scheduling resource.

7. The method of claim 6, wherein the setting up unicast transmission comprises exchanging a configuration of the semi-persistent scheduling resource via vehicle to vehicle radio resource control signaling.

8. The method of claim 6, wherein the setting up unicast transmission comprises: transmitting a direct communication request message, receiving a direct communication accept message, transmitting an access stratum level configuration, and receiving an access stratum level configuration complete message, wherein the monitoring the radio sidelink comprises the second UE starting to transmit or activate the Semi-Persistent Scheduling resource after receiving the direct communication accept message, or after transmitting the access stratum level configuration, or after receiving the access stratum level configuration complete message.

9. The method of claim 6, wherein the monitoring the radio sidelink comprises the second UE starting transmission of the semi-persistent scheduling resource in the condition that there is no existing semi-persistent scheduling configuration for data transmission or the existing semi-persistent scheduling configuration for data transmission does not meet monitoring requirement.

10. The method of claim 6, wherein the monitoring the radio sidelink comprises the second UE stopping transmission of the semi-persistent scheduling resource in the condition that the unicast transmission is released or a radio link failure happens on the radio sidelink.

11. The method of claim 6, wherein the monitoring the radio sidelink comprises the second UE stopping or deactivating transmission of the semi-persistent scheduling resource in the condition that a new semi-persistent scheduling configuration for data transmission is configured and the new semi-persistent scheduling configuration for data transmission or a combination of the new semi-persistent scheduling configuration for data transmission and existing semi-persistent scheduling configuration for data transmission meets monitoring requirement.

12. The method of claim 1, wherein the monitoring the radio sidelink comprises, in the condition that there is no data transmission or there is not enough data transmission for monitoring for a time period, the second UE transmitting data for monitoring.

13. The method of claim 1, wherein the radio sidelink is monitored based on a combination of the transmission of a periodical reference signal and the transmission of data.

14. The method of claim 13, wherein the monitoring the radio sidelink comprises, in the condition that there is no data transmission or there is not enough data transmission for monitoring for a time period, the second UE transmitting the periodical reference signal.

15. The method of claim 13, wherein the monitoring the radio sidelink comprises, in the condition that there is enough data transmission for monitoring, the second UE stopping transmission of the periodical reference signal.

16. A first user equipment (UE), comprising:
    at least one memory; and
    at least one processor coupled with the at least one memory and configured to cause the first UE to:
        set up unicast transmission on a radio sidelink;
        send a request message to a second UE, wherein the request message comprises a request that the second UE transmit data for monitoring;
        receive a reference signal from the second UE; and
        monitor the radio sidelink based on the data and the reference signal.

17. The first UE of claim 16, wherein the reference signal comprises at least one periodical sidelink reference signal, and the processor monitors the radio sidelink based on the transmission of the at least one periodical sidelink reference signal.

18. The first UE of claim 17, wherein the at least one processor is configured to cause the first UE to set up the unicast transmission by: exchanging a configuration of the at least one periodical sidelink reference signal via vehicle to vehicle radio resource control signaling.

* * * * *